United States Patent [19]

Lynch

[11] 3,725,186
[45] Apr. 3, 1973

[54] COMPOSITE CERAMIC ARTICLES
[75] Inventor: John F. Lynch, Oak Ridge, N.J.
[73] Assignee: National Beryllia Corp., Haskell, N.J.
[22] Filed: Nov. 25, 1970
[21] Appl. No.: 92,775

[52] U.S. Cl. ................161/109, 156/89, 264/58, 264/60
[51] Int. Cl. ..................B32b 3/10, C04b 39/00
[58] Field of Search ......161/109, 113, 112; 264/241, 264/57, 59, 60, 61, 62, 67; 156/89, 155; 75/200; 29/182.2, 182.5

[56] References Cited

UNITED STATES PATENTS

| 3,150,974 | 9/1964 | Lund et al. | 75/208 |
| 3,192,086 | 6/1965 | Gyurk | 159/89 |
| 3,226,456 | 12/1965 | Ryshewitch et al. | 264/60 |
| 3,235,939 | 2/1966 | Rodriguez et al. | 156/89 UX |
| 3,239,323 | 3/1966 | Folweiler | 156/89 UX |
| 3,436,307 | 4/1969 | Johnson et al. | 29/182.2 X |
| 3,436,451 | 4/1969 | Wasser | 264/61 X |
| 3,502,520 | 3/1970 | Schwartz | 264/63 X |
| 3,518,756 | 7/1970 | Bennett et al. | 264/61 X |
| 3,564,328 | 2/1971 | Bagley | 264/57 X |

Primary Examiner—Robert F. Burnett
Assistant Examiner—Joseph C. Gil
Attorney—Greene & Durr

[57] ABSTRACT

Dense monolithic bodies having complex internal cavities or passageways are made from sinterable powders by mixing the sinterable powders with an organic film-forming resin, forming a tape from the resin, cutting or stamping a multiplicity of disks, plates or chips from the tape which have the peripheral dimensions of the object to be made, stamping or cutting holes in the disks according to a predetermined pattern, laminating the disks to provide an object with the desired internal structure, and finally heat treating to remove the resin binder and sintering the powdered particles together to form a monolithic structure.

3 Claims, 5 Drawing Figures

PATENTED APR 3 1973 3,725,186

INVENTOR
John F. Lynch by
Greene and Durr

ATTORNEYS

COMPOSITE CERAMIC ARTICLES

This invention relates to a process of making dense monolithic bodies with complex internal cavities or passages from sinterable powders and to the product thus obtained.

Most industrial and technical ceramic or metal articles can be made with complex external geometrics, but not with complex internal cavities or passages. Some ceramic casting molds have been made by the lost-wax type of process, but such molds are thin-walled and not adapted for repeated, heavy industrial use.

Among the objects of the invention is to provide a rugged, monolithic product formed of a sinterable material, said product having a complex internal cavity or passage of substantially any desired geometry. The internal cavity or passage may include under cut portions and complex portions in the form of rings, pockets, channels, baffles, deflectors, gratings, etc. Such articles, especially when made of ceramics, are useful as mixing and/or heat exchange passages for molten compositions. Ceramic articles with internal cavities or passageways ending in square, polygonal or irregular outlet holes can also be produced by the process.

The objects of the invention are attained by providing a tape of resin-bonded, but unsintered ceramic, metal or other sinterable particles, cutting a series of disks or plates from the tape which have the shape of the exterior of the device to be produced, punching holes or cutting out the interior of said disks or plates in a predetermined way so as to provide the complex internal passage or cavity when the disks or plates are stacked or laminated, preliminarily molding said stacked plates and finally firing the laminated structure to provide the monolithic ceramic desired.

Processes are known for the manufacture of resin-bonded ceramic particles together. Such a process is shown, for example, in U.S. Pat. No. 2,966,719 or in British Pat. No. 1,100,756. According to such processes, the finely ground ceramic powder is mixed with about 2.5 to 30 percent of a resin forming composition, spread onto a moving belt or film, dried and/or heat treated to further polymerize or solidify the resin and striped from the belt. The tape or film produced by such process can be 0.003 to 0.060 inches thick and any desirable width. The tape can be readily cut to shape, punched or otherwise formed and, when fired, the resin binder is eliminated, preferably before firing at the final sintering temperature.

Any type of ceramic, metal or other sinterable particles can be mixed with the resin binder to form the unfired tape. Ceramic particles which are useful with the invention include thoria, alumina, ytteria, various kinds of ferrites, beryllia, zirconia, nitrides, borides, carbides, titanates, various mixtures of such ceramics, etc. The several disks or plates which are laminated to make the final product may be identical in composition or may be made of different powdered ceramic products. Generally, the ceramic oxide or composition which forms the basis for the final product is 70 to 99.97 percent pure. Thus, it is possible to make a product of very high purity. Similarly particles of any metal or alloy or other sinterable inorganic material can be formed into a tape and finally molded in the same way.

In the accompanying drawing, which illustrates, by way of example, a constructional form of the invention, FIG. 1 is a view of a green or unsintered tape consisting mainly of inorganic particles bonded by a synthetic resin composition illustrating how disks may be cut therefrom.

Figure 1:
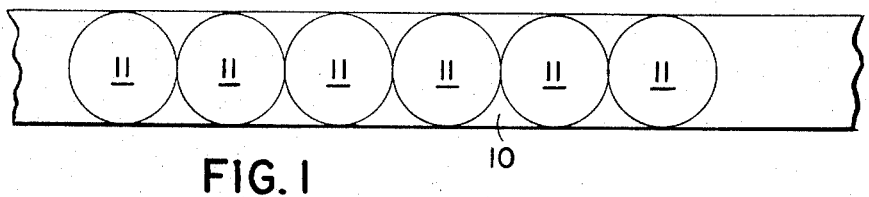
Figure 3:
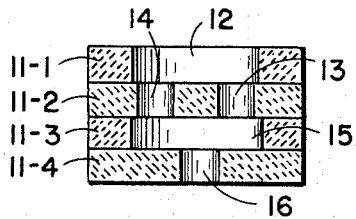
FIG. 3 is a cross-sectional view of a laminated set of disks prior to sintering, said disks being assembled to form a heat exchange device with a complex internal labyrinth with an intricate series of passages so as to avoid laminar flow of the material therethru.
Figure 2:
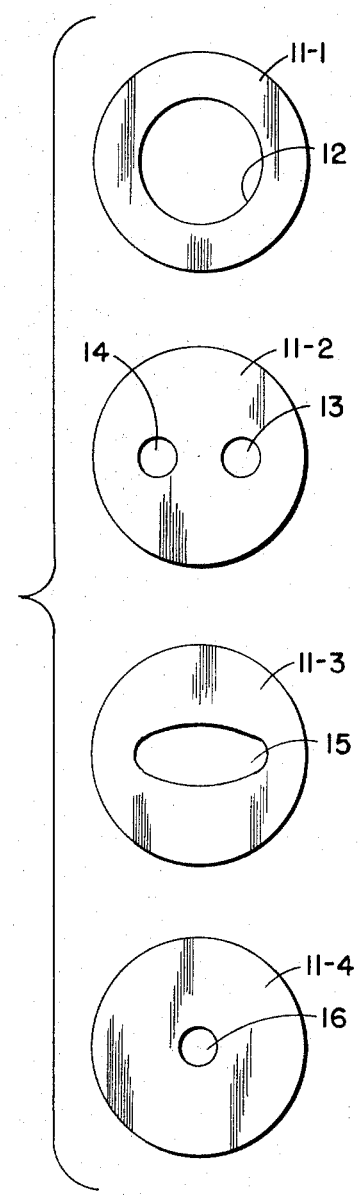
FIG. 2 is an exploded view of a series of disks, such as obtained from the tape of FIG. 1 but showing how the disks may be punched out, cut to form an object such as shown in FIG. 3.

As stated above, the disks or tape, from which the disks are cut, is generally about 0.003 to 0.060 inches thick, so that the thickness of the layers shown in FIG. 3 may be considered as somewhat exaggerated, or on the other hand, the entire device may be considered as greatly magnified. One advantage of the present invention is that products with relatively small outlets can be made.

A plurality of disks 11 are cut from the tape 10. Each one of a series of disks is then further processed by forming the portion of the labyrinth therein which it is to surround in the finished product. Thus, the disk 11-1 has the circular opening 12 cut out, the disk 11-2 has a pair of small holes 13 and 14 punched therein, the disk 11-3 has the elliptical opening 15 formed therein and disk 12-4 has the outlet orifice 16 formed therein. Instead of one disk 11-1, 11-2, etc. two or more of each of such disks can be employed in the stack of FIG. 3 to provide the exact internal outline of the labyrinth desired.

The stack of disks is preliminarily pressed at about 100 to 1,000 pounds per square inch while maintained at a temperature of about 25° to 150° C. Thereafter, the composite laminate is fired in a two-step process, to expel the resin binder and then to sinter the ceramic grains. In the case of a device such as illustrated in FIG. 3 in which the powdered inorganic material is BeO of 96 to 99.95 percent purity, the preliminary heating to remove the binder occurs below 600° C and the product is then fired at about 1,400 to 1,600° C for 1 to 4 hours to sinter the BeO.

Figure 4:
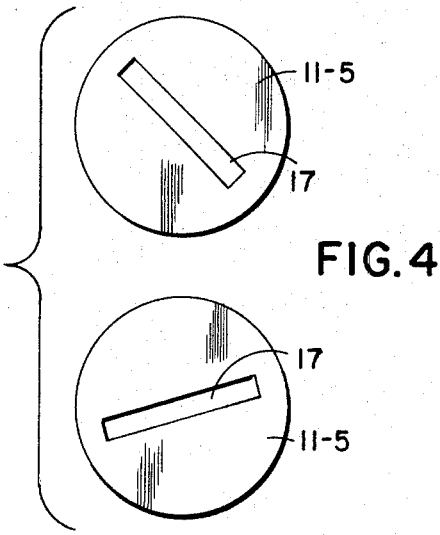
FIGS. 4 and 5 show how two disks can be combined to form an article containing a passageway and having an orifice with a diamond shaped opening.
Figure 5:
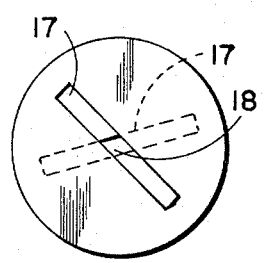

In the product shown in FIGS. 4 and 5, two similar disks 11-5, having slotted opening 17 punched therein, can be combined in such a manner as to provide a diamond shaped opening 18 with sharp edges.

In the finished object, the laminations are completely sintered into a monolithic structure with all joints between laminations hermetically sealed. However, close examination, especially at the edges and in the interior cavity or cavities, will reveal the lines or projections corresponding to the interfaces between the laminations.

I claim:

1. As an article of manufacture, a sintered monolithic, inorganic ceramic body, comprising a plurality of stacked laminations of approximately equal thickness, each of a series of said laminations extending from one side of the body containing at least one interior passageway connecting with at least one passageway in the adjacent laminations of said series, at least one of said interior laminations of said series having a passageway which is undercut with respect to at least one of the passageways in adjacent laminations.

2. The article as claimed in claim 1 in which the ceramic consists essentially of beryllium oxide.

3. The article as claimed in claim 1 in which the inorganic ceramic material is a metal oxide.

* * * * *